June 28, 1932.  R. H. MAYER  1,864,921
APPARATUS FOR CUTTING WHEELS OF CHEESE
Filed Dec. 14, 1931
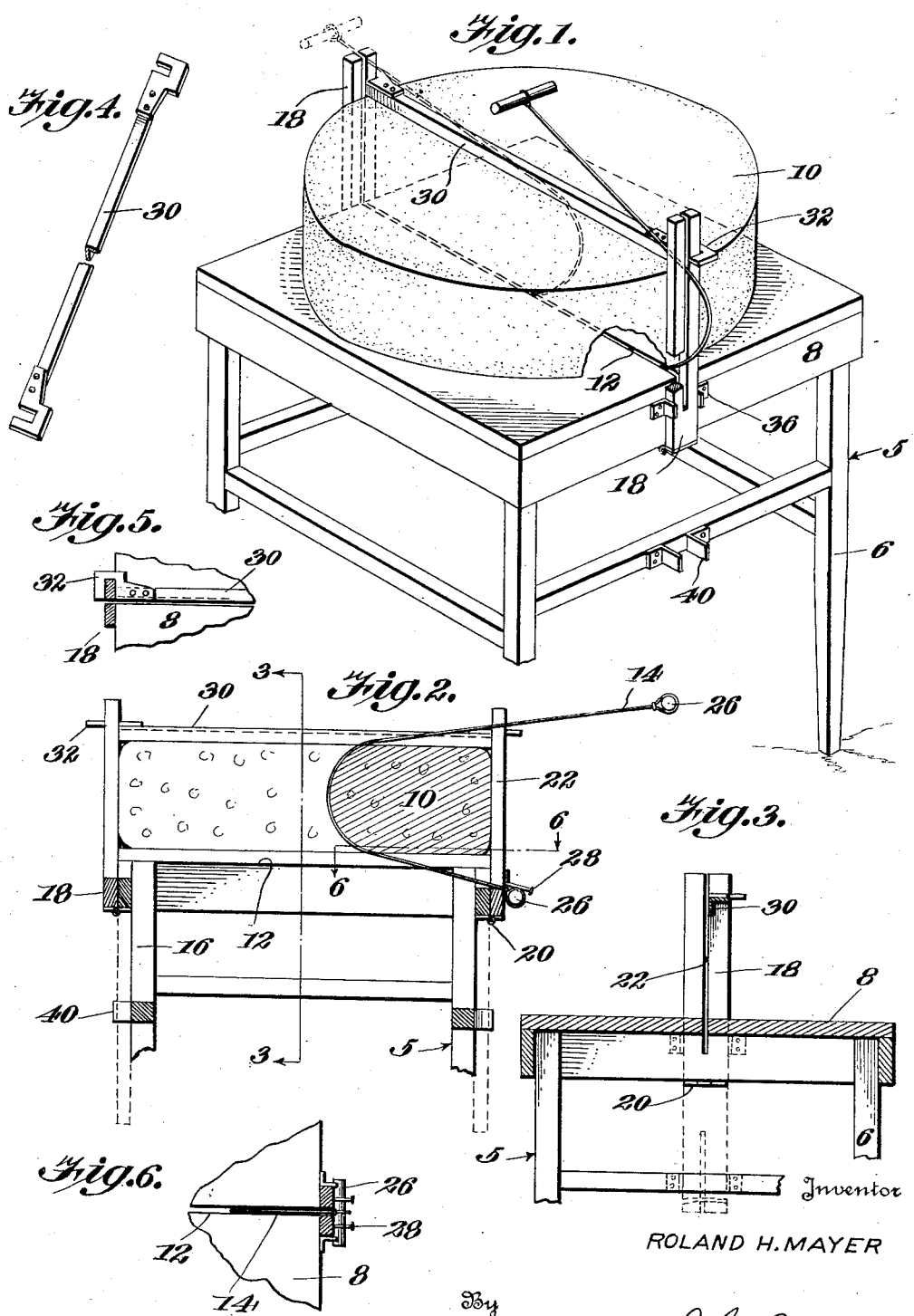
Inventor
ROLAND H. MAYER Patented June 28, 1932

1,864,921

UNITED STATES PATENT OFFICE

ROLAND H. MAYER, OF SAN ANTONIO, TEXAS

APPARATUS FOR CUTTING WHEELS OF CHEESE

Application filed December 14, 1931. Serial No. 580,951.

This invention relates to an apparatus especially adapted for use in cutting blocks or wheels of cheese into segments although, the invention is adaptable to other uses.

Swiss and other cheese is usually put up by the manufacturers thereof in large circular blocks or wheels and when it is desired to cut the cheese into segments for distribution to retailers and others, a small diameter wire, such as a piano wire is drawn through the cheese at the desired place but considerable difficulty has been experienced in holding the wire straight and pulling it through the cheese on a true radial line.

Thus, an important aim of this invention will be to provide a simple means by which a cutting element may be mounted and guided to be drawn through a block of cheese in a highly convenient and expeditious manner to cut the cheese with accuracy and neatness into sections of the desired size.

A further object is to provide a cheese cutting apparatus which is of highly simplified construction, easy to operate and relatively cheap to manufacture and which when not actually in use may be arranged to allow a portion of the apparatus to be used as a table for work or other purposes.

Other objects and advantages will be apparent during the course of the following description.

In the accompanying drawing, forming a part of this application and in which like numerals are employed to designate like parts throughout the same, Figure 1 is a fragmentary perspective of the improved cheese cutting apparatus in use, Figure 2 is a fragmentary vertical sectional view through the improved cheese cutting apparatus in use, Figure 3 is a sectional view taken on line 3—3 of Figure 2, Figure 4 is a fragmentary perspective of a combination arm connecting member and guide for the cutting element, Figure 5 is a detail horizontal sectional view illustrating the connection between an arm and the said arm connector and guide for the cutting element, Figure 6 is a horizontal sectional view taken on line 6—6 of Figure 2.

In the drawing wherein for the purpose of illustration is shown a preferred embodiment of the invention, the numeral 5 generally designates a table having legs 6 supporting a platform 8.

The platform 8 is adapted to support a wheel or circular block of cheese 10 and at a point between opposite sides the platform is provided with a slot 12, extending entirely across the platform for the reception or passage of a cutting wire 14 of a rather small diameter so that the same may be drawn through the cheese, producing a sharp cut.

As shown in Figures 1 and 2, a pair of arms 18 are hinged horizontally at the lower ends thereof to the sides of the table as indicated at 20 and are provided with longitudinally extending slots 22 opening out through the upper ends of the arms and adapted to receive the wire 14 to guide the same, while being drawn through the cheese.

The ends of the cutting wire 14 are provided with cross members 26 of more or less cylindrical form, one of the cross members being detachably secured to one of the arms 12 through the aid of anchoring pins 28 while the other cross member forms a handle for manual engagement. More specifically, the pins 28 are extended outward and downward from the lower portion of one of the arms 18 to form an abutment for the handle when the wire is drawn through the cheese in the manner shown in Figure 2.

As shown in Figures 1 and 2, the arms 18 are detachably connected by a combined arm connector and guide 30, the end portions of which are provided with attaching plates 32 having openings extending out through the sides thereof to receive portions of the arms 18. The sockets or openings in the attaching plates 32 are less in area than one-half the cross-sectional area of the arms 18 so that the attaching plates are prevented from extending across the slots 22 and interfering with the free movement of the cutting wire 14.

It is now pointed out that the member 30 serves first as a guide for the cutting wire 14 and second as a means for connecting the arms 18 to the end that these arms are mutually braced against the strain incident to the cutting operation.

In explaining the first and primary purpose of the member 30 attention is invited to Figure 1 in which it is shown that the smooth inner surface of the member 30 is immediately at one side of the common plane of the slots 22 so that by holding the wire against the member 30 while drawing it through the cheese a true radial cut is made.

In explaining the second function of the member 30 attention is invited to Figure 1 in which it is shown that the arms 18 bear against the vertical surfaces of the sides of the platform 8 and are therefore definitely limited in their inward swinging movement and the connection of the member 30 with the arms thus brings about a mutual bracing action between the arms so that when the wire is drawn through the cheese and manual pressure or body pressure exerted against one of the arms, no parts will be broken or torn loose, and particularly the hinges which support the arms 18, will not be strained unnecessarily.

The arms 18 are shown to be rather broad providing generous surfaces against which body pressure or hand pressure may be exerted to assist in drawing the wire 14 through the cheese, it being apparent that in the case of a large and heavy block of cheese it may be desirable to bear against one of the arms 18 with the body or with one hand, while the other hand of the operator is employed to draw the wire through the cheese.

In carrying out the invention the member 30 may be L-shaped in cross section or otherwise formed, and suitable means such as a close frictional fit between the attaching plates 32 and the arms may be employed to hold the member 30 in place until such time as the same is removed.

The apparatus forming the subject of this application is capable of use in connection with blocks of cheese of various sizes and provides a simple and reliable means by which sharp cuts may be made through the cheese on the desired line to cut segments of the required size without the uncertainty and lack of neatness so annoying in other types of cheese cutters.

When the cheese cutter is in use as such, the arms 18 are, of course, arranged in the upright positions shown in full lines on Figures 1 and 2 preferably between the angle members 36 and when the apparatus is not in use, the arms may be swung down to the dotted line positions shown in Figure 2 to allow of the use of the platform 8 as a work or other table. When the arms 18 are in the lowered positions shown in dotted lines in Figure 2, the arms are confined between L-shaped retaining members 40.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention what is claimed is:—

1. In an apparatus for cutting blocks of cheese into segments a platform, arms horizontally hinged to the platform at points spaced below the upper surface thereof to cause the arms to engage the sides of the platform, said arms being provided with slots opening out through the upper ends thereof, and a cutting wire passing through said slots and having the end portions provided with cross members, and means to anchor one of said cross members in a relatively fixed position, the other cross member forming a handle for manual engagement.

2. In an apparatus for cutting blocks of cheese into segments, a platform, arms horizontally hinged to the platform and provided with slots opening out through the upper ends thereof, a cutting wire passing through said slots and having the end portions provided with cross members, means to anchor one of said cross members in a relatively fixed position, the other cross member forming a handle for manual engagement, and a combined arm connector and wire guide having means for engaging said arms.

3. In an apparatus for cutting blocks of cheese into segments, a platform, arms horizontally hinged to the platform and provided with slots opening out through the upper ends thereof, a cutting wire passing through said slots and having the end portions provided with cross members, means to anchor one of said cross members in a relatively fixed position, the other cross member forming a handle for manual engagement, and a combined arm connector and wire guide having means for engaging said arms, said combined arm connector and wire guide being provided with a wire engaging surface parallel to the plane of said slots.

4. In an apparatus for cutting cheese into segments, a platform having a slot extending out through the sides of the platform, arms horizontally hinged to the platform and having slots opening out through the ends thereof and in alignment with the slot in the platform, a cutting wire for movement through the first and second named slots and having a cross member, means carried by one of said arms to detachably anchor said cross member thereto, a handle carried by the other end of the wire, and a combined arm connecting and wire guiding element having means detachably engaging said arms.

5. In an apparatus for cutting blocks of cheese into smaller units, a platform, arms horizontal hinged to the platform and being provided with slots opening out through the upper ends thereof, a wire for cutting cheese and of a diameter to pass through said slots, and a combined wire guide and arm connector having the end portions thereof provided with transverse openings receiving portions of said arms, said wire guide and arm connector being provided with a wire engaging surface adjacent to the plane of said slot and parallel thereto.

In testimony whereof I affix my signature.
ROLAND H. MAYER.